Fig.1

Aug. 26, 1941.   J. I. HAASE ET AL   2,253,781
TIRE BUILDING APPARATUS AND METHOD OF BUILDING TIRES
Filed May 13, 1937   6 Sheets-Sheet 2

Inventors
Jorgen I. Haase
William W. McMahan
and Charles J. Roese
By
Attorney

Aug. 26, 1941.  J. I. HAASE ET AL  2,253,781
TIRE BUILDING APPARATUS AND METHOD OF BUILDING TIRES
Filed May 13, 1937   6 Sheets-Sheet 4

Inventors
Jorgen I. Haase
William W. McMahan
and Charles J. Roese

Attorney

Patented Aug. 26, 1941

2,253,781

UNITED STATES PATENT OFFICE 2,253,781

TIRE BUILDING APPARATUS AND METHOD OF BUILDING TIRES

Jorgen I. Haase, William W. McMahan, and Charles J. Roese, Akron, Ohio, assignors to Wingfoot Corporation, Wilmington, Del., a corporation of Delaware Application May 13, 1937, Serial No. 142,418

46 Claims. (Cl. 154—10)

The present invention relates to an apparatus for building rubber tires and the like by what is known as production methods. The device embodies essentially a plurality of tire-building machines arranged in a group, conveying means for supplying the operators at the machines with the proper material when required, and servicing means for supplying material to the conveyor and other servicing means for removing finished tires therefrom.

One object of this invention is to provide suitable equipment so arranged as to permit a subdivision of operators whereby learning time is reduced and the operators' efficiency improved through specialization.

Another object of this invention is to simplify the method of producing tires whereby each operator working on a series of machines repeats his operation on each machine in succession, whereby after a predetermined number of operators have worked on a given machine the tire is completed and may be removed.

Another object of this invention is to provide a tire-building apparatus having but very few moving parts as compared with previous apparatus of this character.

Another object of this invention is to provide in an apparatus of the character described a series of stationary tire-building machines and a moving conveyor of a simplified character. Preferably the machines are arranged in a circular formation with a single rigid annular conveyor rotating thereabout, with suitable servicing stations adjacent to and in the embodiment shown outside the conveyor for supplying materials thereto, whereby compact arrangement is obtained and a saving is made in the time necessary for building a tire.

Another object of this invention is to provide an apparatus and method for building tires which permits a certain degree of flexibility whereby if an operator is delayed slightly beyond the time set aside for each unit operation, the method is not interrupted. A slight amount of leeway on time is permitted but the delay, if any, can not be cumulative.

Another object of this invention is to provide tire-building apparatus in which there are a series of tire-building machines at which a series of operators work successively and a conveyor moving past said machines continuously in a direction opposite to the direction of operators at a rate of speed the same as the rate of progress of the operators along the series of machines or in multiples thereof.

Another object of this invention is to provide a tire-building apparatus in which a series of operators work at a series of machines and progress from one machine to the next in the series, and provide in that apparatus a conveyor moving past the series of machines at a rate which is a multiple of the rate at which the operators progress along the series of machines.

Another object of this invention is to provide conveying means for the material to be supplied to operators working successively on a series of tire-building machines which embodies an annular supporting member movable about its axis and a series of material-receiving pockets thereon grouped to receive the component parts of a tire, each group comprising the same component parts of the tire, the spacing being such that a group of such materials will be adjacent each tire-building machine that is being operated upon by the operators in substantially the same relation thereto at any given time, the movement of the conveyor being such that the particular material used by an operator is at a convenient position within reach of the operator when needed while standing closely adjacent the machine on which he is to perform his particular operation.

Another object of this invention is to provide a tire-building apparatus in which there are a series of tire-building machines and a moving conveyor for supplying materials to the machines, the conveyor having a series of material-receiving pockets or supports so arranged that certain of the pockets or supports will supply the same machine at all times and periodically return to a position adjacent thereto when material held on said support is required at that machine.

Another object of this invention is to provide in an apparatus of the character described a servicing means for the conveyor which furnishes supplies therefor without the necessity of first storing the material in liners such as has been practiced heretofore in the art. A particular object of providing such a servicing means is to supply the material directly to the conveyor from the servicing means. Preferably the servicing means embodies a bias cutter and a festooning rack into which the supplies are fed after they have been cut by the bias cutter, with delivery means on the festooning device for delivering material to a position closely adjacent the conveyor, whereby the operator may supply the conveyor with the material so cut.

Another object of this invention is to provide in an apparatus of the character set forth a series of tire-building machines to be successively worked at by a series of operators in turn, a conveyor moving in the opposite direction to the direction in which operators move from machine to machine in the series, and suitable fabric-supplying means for supplying strips of fabric of different widths for the different plies at a rate commensurate with their use in the tire-building operations, the movement of the conveyor in the opposite direction to the direction in which the operators progress providing a more uniform distribution of empty pockets to be supplied with the ply fabric, whereby the ply fabric may be laid on the conveyor at substantially the same rate as it is delivered by the festooning device operating in the aforesaid manner.

Another object of this invention is to provide a series of tire-building machines and a plurality of tire-material guides mounted for movement from one machine to the next in the series and so on through the series, there being suitable guiding means for the guides for positioning the guides in proper relation to the tire-building machines, whereby the materials may be properly guided onto the tire-building drums of the tire-building machines, the guides each being arranged for the particular type of material to be supplied to the tire-building drum.

Another object of this invention is to embody in a tire-building apparatus of the character described, a bias cutter and a festooning rack for supplying the material conveyor, the bias cutter being normally operative to supply uniform quantities of the different required widths of ply fabric to be used in building the tire, substantially at the rate the same are used by the operators in building the tires.

Another object of the invention is to provide means whereby tire-building material of the proper width is supplied directly to the conveyor without the usual intermediate step of employing a fabric liner in which the fabric is first wrapped after being cut to the proper width.

Another object of this invention is to provide a method and apparatus for building tires in which the material is supplied at a uniform rate to the tire builders and substantially commensurate with the rate at which the materials are used by the operators.

Another object of this invention is to provide an apparatus for mass production of tires and the like wherein a series of tire machines supplied by a single conveyor with material and operated upon by a plurality of operators is so constructed that one or more of the machines can be used for building a different-sized tire than those built on the other machines.

Other objects of this invention will appear hereinafter as the description thereof proceeds, the novel features, arrangements and combinations thereof being clearly set forth in the specification and claims thereunto appended.

In the drawings:

Fig. 18 is an elevational view showing the servicing of the bias cutter from the calender;

Fig. 19 is a plan view of a modified arrangement of the fabric feed shown in Fig. 18;

OPERATION IN GENERAL

Various apparatus have been devised for increasing production on automobile tires and the like by what is known as mass production methods and the present invention also contemplates this object and the accomplishment of that object in a simple and efficient manner. In general the system embodies a series of tire-building machines mounted on a support, the machines preferably being arranged in a circle with a conveyor arranged parallel to the series of machines and being relatively movable with respect to the machines to convey material to the operators working thereon. The conveyor preferably moves with a uniform continuous motion to supply the various materials used by the operator and the material supplied to the conveyor from suitable servicing equipment arranged about the apparatus.

Figure 1:
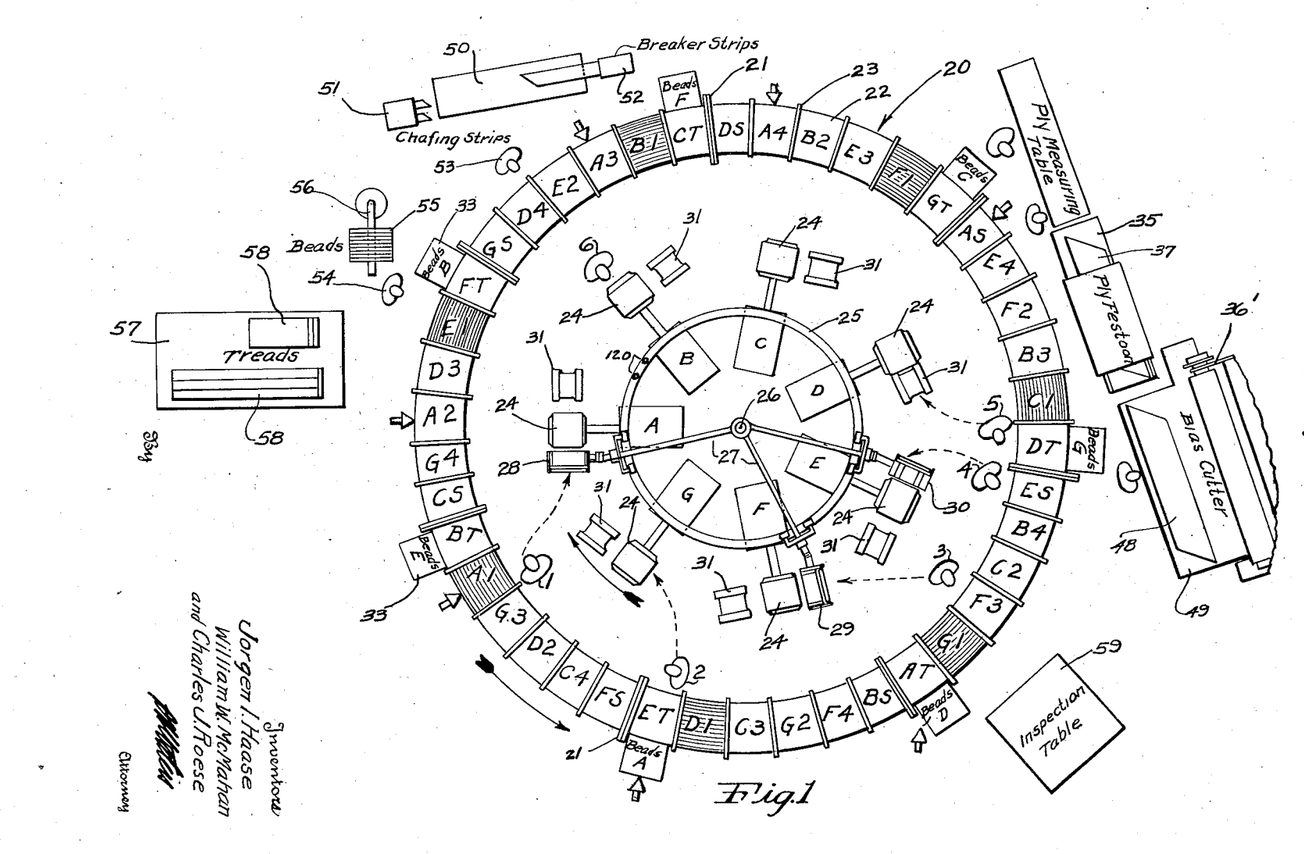
Fig. 1 is a plan view of a tire-building apparatus including servicing equipment therefor.
Figure 2:
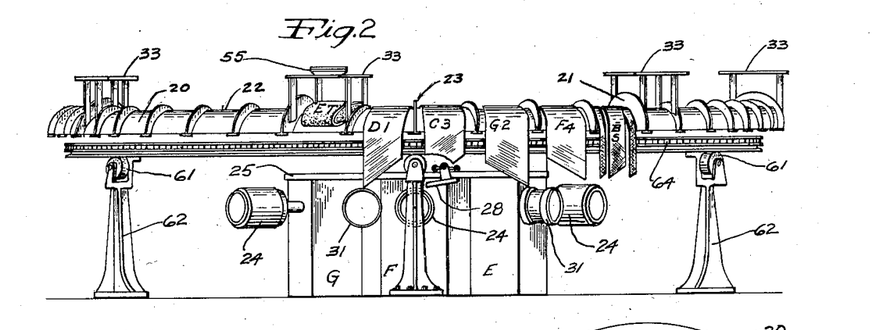
Fig. 2 is a front elevational view of the apparatus shown in Fig. 1.
Figure 3:
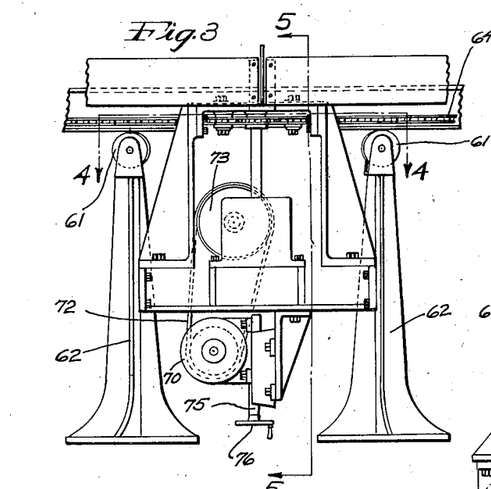
Fig. 3 is an elevational view showing the driving means for the material conveyor in Figs. 1 and 2.
Figure 4:
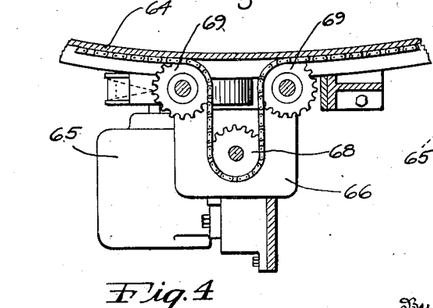
Fig. 4 is a horizontal cross-section taken along the line 4—4 of Fig. 3.
Figure 5:
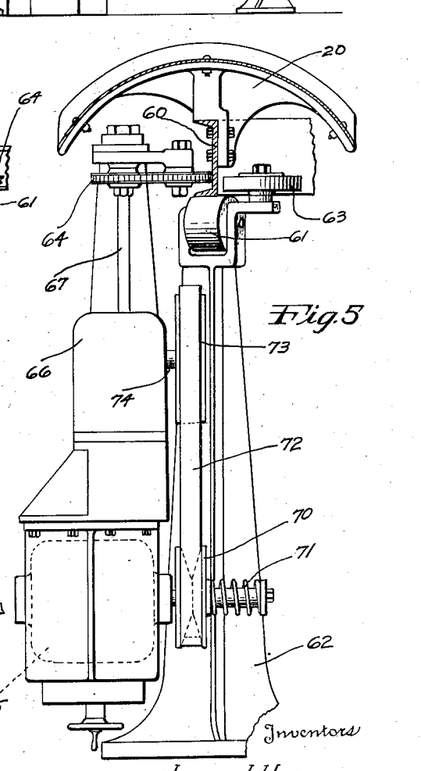
Fig. 5 is an enlarged vertical cross-section through the conveyor and driving means therefor taken along the line 5—5 of Fig. 3.

Referring now particularly to Figs. 1 and 2, the reference character 20 indicates generally an annular conveyor substantially arcuate in cross-section as shown in Fig. 5 with main upstanding partitions 21 defining 7 sections of the conveyor, each section being sub-divided into a plurality of material-receiving supports or pockets 22 by the upstanding partitions 23. Arranged centrally of the annular ring are a series of seven tire-building machines A, B, C, D, E, F and G fixed to the floor and carrying the usual building drums 24 upon which the tires are built in the manner hereinafter set forth. A circular guide rail 25 rests on and is secured to the upper portions of the tire-building machines A to G inclusive. A central fixed support in the form of a shaft 26 has a plurality of material guide-supporting arms 27 pivoted thereto. On the outer ends of these arms are mounted the guides 28, 29 and 30, the first guide being for the first and second plies, the second to be used for the third and fourth plies and the last to be used for the breaker and chafer strips. These guides are used for guiding the edges of the fabric as the fabric is wrapped about the drum, whereby the fabric will occupy its proper position longitudinally of the surface of the drum. In building tires it is customary to offset the plies with respect to each other and some plies are of different widths than others. The breaker and chafer strips are of different widths and are arranged at different distances longitudinally of the building drum. Separate guides are provided for each of the chafer strips and for the breaker strip, the latter being arranged centrally of the drum and the former being near the edges thereof, as will be more fully brought out hereinafter.

Adjacent each tire-building drum is another drum 31 used in applying the tread to the outer part of the carcass. Some of the details of the tire-building machines, together with their accessories and driving means have been omitted from the drawings for the sake of clearness, as they do not form a part of the present invention. Between the series of tire-building machines and the annular conveyor there is an aisle which permits the operators to progress from machine to machine during the building of the tire.

Operator's Functions

In carrying out the invention, the tire-building operations are broken up into seven principal operations noted in Figs. 11 to 17 inclusive, one of which is an automatic operation with the breakdown such that the time required for each operator to perform his operation is about the same amount of time as that for any other operator. The invention contemplates the use of six operators to perform the six non-automatic operations with each operator performing his particular operation on a drum and then moving to the next drum in the series to perform the same operation, each operator performing a different operation.

As shown in Figs. 11 to 17 inclusive the No. 1 operator applies the first and second plies to the building drum, No. 2 operator stitches down the ends of the fabric to receive the beads, applies the beads and turns up the first and second plies over the beads to retain them in place. No. 3 operator applies the third and fourth plies. No. 4 operator applies the breaker and chafer strips. No. 5 operator applies the tread. The sixth operation is automatic and the last man in the group, No. 6 operator, does several operations, among which are the turning down of the third and fourth plies over the bead, collapsing the drum, removing the tire from the drum, applying the beads for the next tire to the inner and outer bead rings, expanding the tire drum and cementing same in readiness to receive the first and second plies of the next tire to be built on that machine.

Operation Exclusive of Servicing

The operators 1 to 6 inclusive move about about the tire-building machines in a clock-wise direction while the conveyor moves in a counter-clockwise direction, although this is not to be considered as limiting as our invention contemplates the use of a conveyor moving in the same direction as the operator. However, by using the reverse movement of the conveyor, the linear movement thereof need not be as great as when the conveyor moves in the same direction as the men, whereby to facilitate loading and unloading of the conveyor. The six operators are shown in Fig. 1 of the drawings with No. 1 operator ready to work on No. A machine, No. 2 operator ready to work on G machine, etc., for the next three operators. It should be noted that there is no operator shown at tire-building machine C. At this machine there is an operation being performed but it is automatic and includes the step of automatically stitching the plies, fabric and tread firmly together. No. 6 operator works on the last machine, which is No. B.

In general the operators move about the tire-building machine in a clockwise direction and as they pass the conveyor they remove the material that they require therefrom and then apply this material to the tire which is being built. The conveyor in the embodiment of the invention shown in Fig. 1 is adapted to move in a direction opposite to the movement of the operators and at a speed such that the conveyor completes one complete revolution each time the operators have made a complete circuit of the tire-building machines, the relative movement therefore being 1 to 1 but in opposite directions. However, it must be considered that the operators move intermittently with most of the time being spent at the building drum while the conveyor preferably moves continuously at a uniform rate, although it is within the scope of this invention to advance the conveyor intermittently.

The Material Conveyor

The drawings show seven tire-building machines and a conveyor divided into seven main sections, each section divided in turn into a plurality of six compartments with an extra shelf 33 (see Fig. 2) mounted above one of the pockets or material supports of each section to receive the tire beads. Note in Fig. 1 this shelf is shown outside of the conveyor periphery for illustrative purposes only.

In the preferred embodiment of the invention shown in the drawings, it is contemplated that as any operator arrives at each machine his particular material will be at that machine within easy reach and in time for him to perform his operation on that machine. The various sections are therefore divided into a plurality of pockets or material supports which receive the different materials used in building tires, the arrangement of these supports being the same for each section so that the same type of material will be located at the same relative position in each section. Thus, let us assume that operator No. 1, is about to move over to machine A, and use material which is located on the material support A1. At the same position in each section will also be found a ply numbered 1 with a suitable machine designation in front of the numeral 1. These sections are shown shaded to make same stand out clearly in the drawings. The pocket designations are identified first by the letter of the machine to which the material in that pocket is to be supplied and this letter is followed by a number or letter indicating the type of material in that pocket. Thus, taking the section in which is found the designation A1 at the lower left in Fig. 1 and reading from left to right in that section, the designations and their interpretation are as follows:

BT—Treads for B machine,
A1—No. 1 ply for A machine,
G3—No. 3 ply for G machine,
D2—No. 2 ply for D machine,
C4—No. 4 ply for C machine,
FS—Breaker and chafer strips for No. F machine.

In the more-or-less diagrammatic showing in Fig. 1, the beads are shown as supported on extensions of the pockets AT, BT, CT, etc., but these beads are actually mounted on the platforms or shelves 33 as shown in Fig. 2, directly above the pockets AT, BT, CT etc.

In working on this apparatus No. 1 operator works first on machine A, then B, etc., and he therefore requires material from the pockets A1, B1, C1, etc., which are shown shaded in Fig. 1. It will be noted that A1 and B1 however are separated by a distance of two sections. This is because of the fact that the operators move the distance of one section in one direction and the conveyor moves the distance of another section in the opposite direction, that is considering angular distances. In other words, any one operator takes his material from alternate sections. The operators pick up their materials as they move from one machine to the next and it will be noted from an inspection of Fig. 1 that, regardless of the operator, the material is always in a position to be picked up by the operator without going out of his path of travel from one machine to the next.

Fig. 1 illustrates the men opposite the pockets from which they receive their material, except for No. 6 operator who is shown opposite the machine he works on but who has picked up the beads as he moved to that position. No. 1 operator, however, also applies No. 2 plies to A machine and the pocket for this material is designated A2, which pocket, it will be noted, is not as yet in a position convenient to the operator. However, by the time the operator has applied No. 1 ply and is ready for the second ply in A2, this pocket has moved counter-clockwise to such a position that the operator can conveniently reach the same and apply it to the building drum. The same is true of operator No. 3 who applies the third and fourth plies obtained from pockets F3 and F4. The other operators remove material from the conveyor only once for each tire with the exception of operator No. 2 whose operations do not require any material.

We will now summarize the description of the conveyor and the movement of the operators given above. The operator when working on a certain designated machine will always take material from a pocket with the same letter designation thereon as on that machine and the conveyor is so constructed and operated that this pocket will be in convenient position for him to do so as he moves into operative position at that machine. It will be noted also that the pocket having an operator's material is always in the same position with respect to the operator regardless of the machine upon which the operator is working if the operator is on schedule in his movement from machine to machine. Suitable mechanism can be provided for indicating the time at which the operators should be finished with their operation and should move to the next machine so that the operators will keep on schedule and thus be assured of having the material they want at the proper place. However, if the operator should be a little early or late, the pocket containing the material he wants for the next machine is not much out of the predetermined position and he can remove the material therefrom without appreciable additional effort since the conveyor is moving at a relatively slow rate.

The material for any one machine, such as machine A, is also distributed about the conveyor but not with uniform spacing, but with such a spacing as to be conveniently available when desired by the operator. Considering machine A, for instance, the material for this machine will be found in the pockets indicated by the stub arrows outside the conveyor.

Since material for any machine, for instance A, is always supplied from the same pockets, it is obvious that if these pockets are filled with a material which is for a different size tire than that which is being built on machines B to G inclusive, the operators could build on any selected machine a different size tire than on the other machines. The desired drum would be mounted on the selected machine and the ply guides 28, 29 and 30 would, if necessary, be equipped with adjustable material guides such as described hereinafter. This functioning of applicants' apparatus is contemplated by them.

It will be understood that the lettering on the conveyor sections has been made purely for the sake of description and while the same system could be employed in actual practice, applicants prefer to use other modes of designation and in actual practice a color scheme is used. For instance, let us assume that the A machine was colored green, or at least a portion of it sufficient to identify that machine. Then, all the pockets lettered "A" in the drawings or portions thereof would be painted green. Thus, the operator, when he is operating on schedule, will arrive adjacent a pocket which is approximately at the position where he knows he is to take his material and at a glance he can recognize the pocket from which he will take the material for it will have the same color designation as the machine on which he is to operate and no pocket near it will be designated with the same color.

Modified Conveyor Movement

While we have indicated the conveyor in the preferred embodiment as moving one complete revolution in a counter-clockwise direction while the operators move one revolution in a clockwise direction, this could be changed so that the conveyor moved at twice the speed, in which case the pocket designations would have to be changed. For instance, if operator No. 1 took the first ply material from pocket A1 when working on A machine, then, when working on B machine, due to the increased rate of movement of the conveyor, the pocket now designated F1 will be in position adjacent the B machine and the first ply stock will be removed from F1 for B machine. Therefore in this set up the F1 designation should be changed to B1. The other pockets would be changed similarly so that the distribution of the material would be such that each kind of material would arrive opposite the machine at which it was to be used at the proper time. This and other variations of the relative movement of the conveyor and operators are within the scope of the invention. When the relative movement is changed it will usually require some rearrangement of the material supports or pockets.

It is also possible to move the conveyor in the same direction as the operators but in this case the speed of movement would be in multiples of the speed of movement of the operator from machine to machine, as otherwise no new pockets would be presented to the operator as he moved about the circle. Other changes in the relative speeds of the operators and conveyor may be made within the scope of this invention and the conveyor may be moved intermittently or continuously, although the continuous movement is preferable. It is also possible to employ an even number of sections on the conveyor or even a considerably greater number of sections than the number of machines if the conveyor is made in the form of an endless flexible chain conveyor or the like, and in which the extra length of the conveyor extends in a loop outside the circle such as will be more fully set forth hereinafter.

One or more additional machines can be placed in the group, making at least eight machines. In this case while there would be one or more vacant machines between the first and sixth operators, nevertheless, all of the machines would be worked on eventually, but in the event that one machine broke down all of the operators could be kept busy and the extra broken-down machine or machines could be skipped by the operators. If one machine of the seven illustrated in Fig. 1 is out of order the operators still continue to use the other six machines, but with the loss of one tire for each time they travel about the circuit. This can be made up in part by increasing the speed of the pace-setter conveyor a slight amount until the machine is repaired.

PLY SERVICING

*Calender, bias cutter, festoons*

Another advantage obtained from moving the conveyor in a direction opposite to the movement of the operators is that when servicing the plies to the conveyor it is found that the empty pockets presented at the servicing station require the various plies in a uniform manner. In other words, generally the first and second plies are of one width and the third and fourth plies of another width for reasons well understood in the art and, therefore, if a single servicing station is to supply both first and second plies and third and fourth plies, it is necessary to have two different widths of fabric and if the empty pockets, as they are presented to the operator, require first a ply of one width and then a ply of the other width, then of the first and then of the second in an alternating manner, it is much easier for the man servicing the conveyor to perform his duties than where the pockets coming to the servicing position first require a series of one width, then a series of another width, etc. It is also better for the operation of the bias cutter and splicer as we will now proceed to show.

The present invention contemplates the use of a festoon rack 35 of any desired type such as that shown in Patent No. 1,939,629 in which there is a double festoon so that two strips of material of different widths may be fed therethrough simultaneously. The bias cutter 36', of any well-known construction, such as that shown in Patent No. 2,001,572, is equipped with automatic ply width varying mechanism to cut plies in the present instance of the two widths required for the building of the tire or cut as many widths as may be required for a given time.

Figures 6, 7, 8, 9:
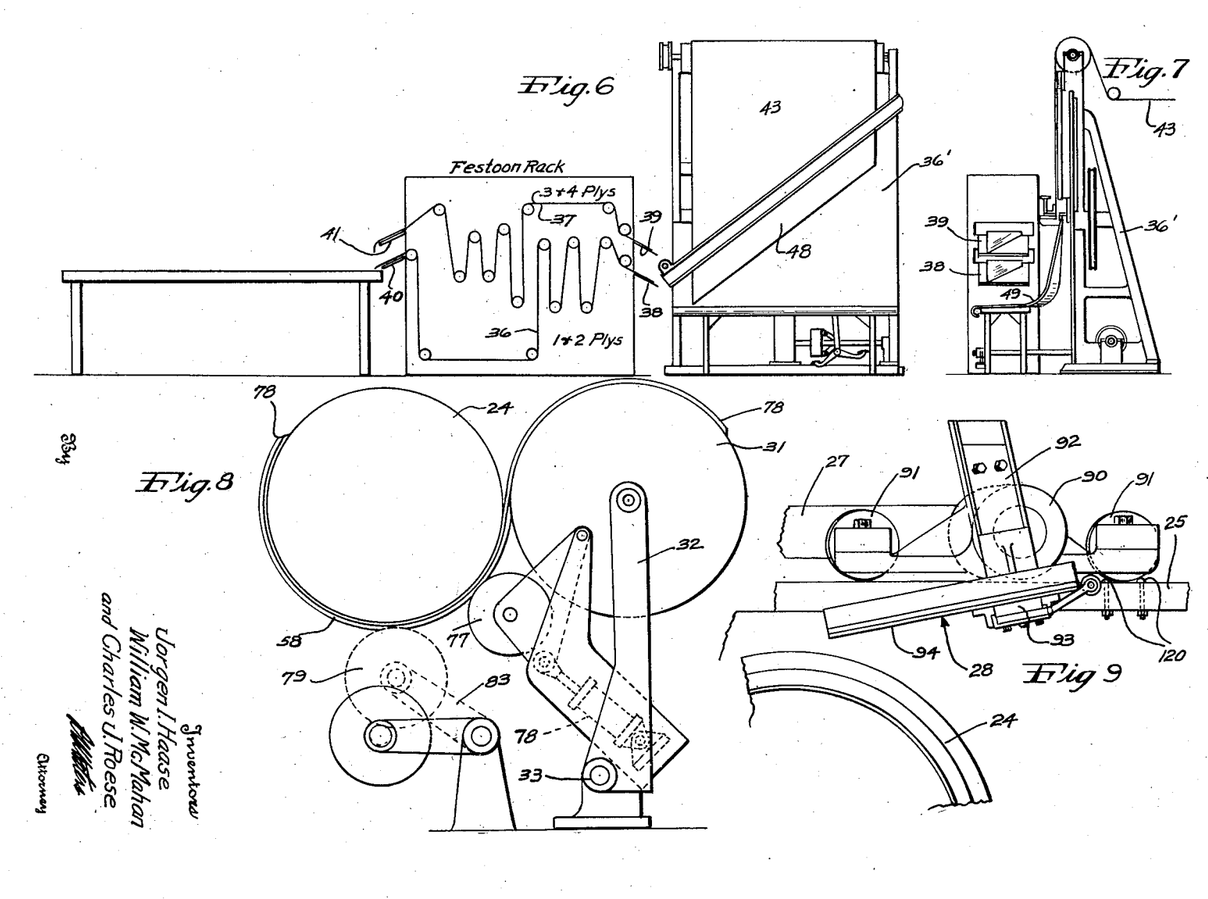
Fig. 6 is an elevational view, somewhat diagrammatic, of the apparatus for furnishing plies to the conveyor.
Fig. 7 is an end elevation of the apparatus shown in Fig. 6.
Fig. 8 shows the tread patters and stitchers used in applying the tread.
Fig. 9 is an enlarged elevational view of one of the ply guides.
Figure 8:
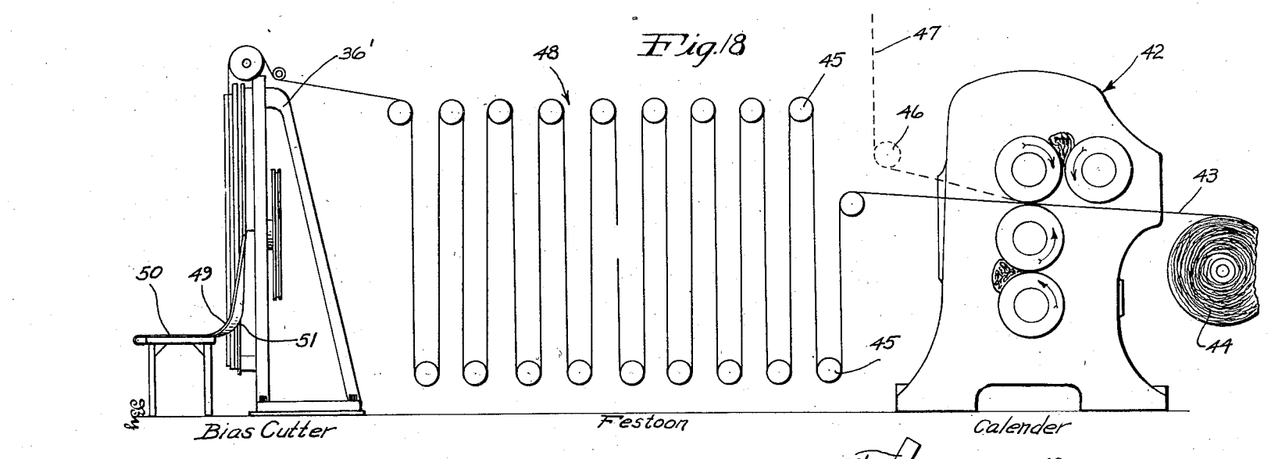
Figures 9, 10:
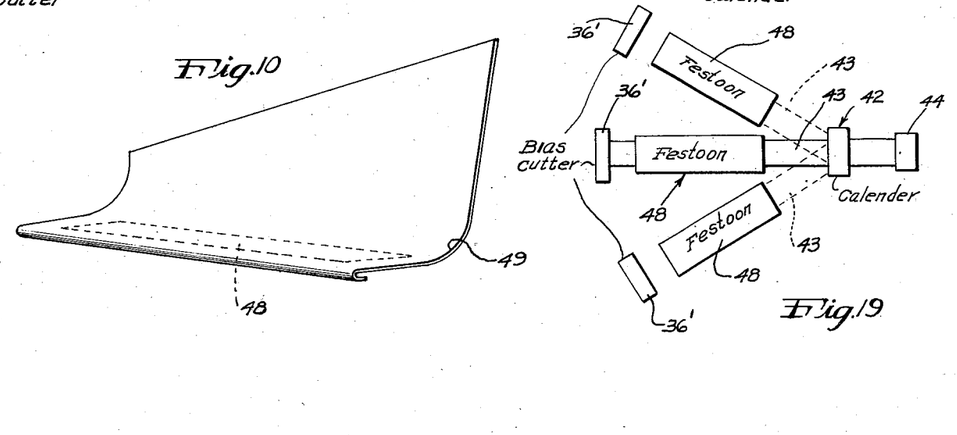
Fig. 10 is a perspective view of the bias-cutter slide.

The bias cutter is provided with a slide 49 for conveying the cut material 48' shown by full lines in Fig. 6 or Fig. 10 from the vertical position illustrated to a horizontal position such as indicated by dotted lines in the perspective view Fig. 10. The operator then places the cut strip on the table 39 or 38, as the case may be, and splices the cut strip to the end of the strip which is to pass through the festoon rack.

The festoon rack shown diagrammatically in elevation in Fig. 6 has two festoons of material running therethrough, designated 36 and 37 in the drawings. Let us assume that 36 is material of a width for first and second plies and 37 material of a width for third and fourth plies. At the bias-cutter end of the festoon rack are guides 38 and 39 for guiding the material into the festoon rack and at the same time forming tables upon which the strips of fabric coming from the bias cutter may be spliced by the operator to form a continuous strip. Similar guides 40 and 41 are provided at the left end of the festoon rack and the operator takes material first from one festoon and then the other and tears the material to the proper length for a given ply, the material being marked by any suitable means (not shown) in the festoon rack so as to make it unnecessary for the operator to measure out the length of fabric required.

One feature of the embodiment shown is to provide a conveyor mechanism moving in such a relation with respect to the operators that the material supply for the plies can operate in a uniform manner to furnish alternating plies of different widths, whereby the festoon rack can supply plies alternating different widths and the fabric may be cut to different widths alternately by the bias cutter. Of course it may be necessary to occasionally make a repeat cut on the bias cutter to compensate for bad sections which occur in the fabric or for other reasons, but the normal operation would be more or less uniform and this would increase the efficiency of the operators and the mechanism employed, making it possible for the one bias cutter to supply more than one unit of the type disclosed herein. The number of cuts of any width may be varied to effect the most efficient use of the bias cutter and festoons.

In Fig. 18 I have illustrated means whereby a bias cutter such as 36' may be supplied directly from a calender 42 of a type such as that disclosed in Patent No. 1,969,232, or any other type for that matter. The material 43 supplied from the fabric roll 44 passes through the calender 42 and over a series of festoon rollers 45 in a festoon to form a plurality of loops, and then into the bias cutter where the same is cut to proper width and supplied to the conveyor. This festoon may be, and preferably is, of a considerable length with suitable automatic devices for raising and lowering the rollers to prevent too much strain from being placed upon the fabric and, since such means are well known in the art to which this invention pertains, no description thereof is made herein. Since the calender generally operates at a greater rate of speed than the bias cutter, the festoon, if originally practically empty, would soon be filled and, of course, the greater the length of the festoon, the more it would contain and the longer the calender could be kept in operation. When the festoon rack is completely filled the calender can be shut down, but preferably it is used to supply other festoon racks which may be located to one side or above or below that which is illustrated in the drawings. For instance, it could be used to supply a festoon rack on the floor above the one illustrated by running material up over the roller 46 to the next floor as indicated by dotted lines 47. With this arrangement, the necessity of placing the calendered material in liners and forming huge rolls of same as is common practice, is done away with and the material is fed directly to the bias cutters, thus saving considerably in labor, equipment and storage space and increasing the all-around efficiency of the unit.

Also, with this invention the fabric strips are fed directly from the bias cutter into the festoon, making it unnecessary to roll the spliced strips in liners as has been the common practice. Thus, all of the plies are supplied to the material conveyor directly from the calender without the use of any liners whatsoever. Considerable storage space is eliminated and also considerable conveying mechanism, operators, etc., which may be necessary to operation of devices shown in the prior art and in common use today. If the festoons are all on the same level, the material is fed over angularly displaced rollers from the calender to the festoons not in line with the calender. See, for instance, Fig. 19, the dotted lines indicating the general course of the material when feeding the festoons to the right and left of the calender.

Instead of using rolls of fabric, creels of cords are used to feed cords directly to the calender to form fabric of a width such that when cut by the bias cutter the plies are of the proper length. Thus, the festoons can be eliminated and the plies serviced directly to the conveyor from the bias cutter.

SERVICING OF BEADS, CHAFERS, BREAKERS AND TREADS TO CONVEYOR

Referring again to Fig. 1, there is shown at the upper left-hand corner thereof a work table 50, a liner 51 in which the chafer strips are rolled, and a liner 52 in which the breaker strips are rolled. These strips are either cut to length before being placed in liners or cut to length on the work table 50. The operator 53 stationed at this servicing station places the material in the pockets of the conveyor having the designation S at the end thereof. For instance, the designation on the next pocket to be serviced is GS. Operator 54 shown at the left takes beads 55 from the bead rack 56 and places them on the supports 33. This operator also supplies the treads to the pockets having designation T at the end thereof. These treads come booked as on the truck 57. The operator doubles the tread upon itself, as at 58, and then slides it into the proper pocket on the conveyor. Before placing the tread on the conveyor the skived ends thereof are benzened to prepare the joint for the tread-applying operation. At the lower right is an inspection table 59 and any suitable means may be provided for conveying the tires away, such as by an endless conveyor looped so as to have a portion thereof traveling overhead entirely about the circle in order that each tire as it is finished may be placed on the conveyor and conveyed away. In that case the inspection table would be located somewhere along the conveyor line.

Referring to Fig. 2, it will be noted that one section is illustrated as being filled with the different materials ET, D1, C3, G2, F4 and BS corresponding to the lower section in Fig. 1. The beads 55 are shown on the bead rack 33. Due to the arcuate construction of the upper surface of the pockets, materials easily slide out of the pocket when the operators pull on same to remove them from the pockets.

CONVEYOR DRIVING MECHANISM

In Figs. 2, 3, 4 and 5 we have illustrated the means for driving and supporting the conveyor. On the under side of the conveyor 20 is a channel 60 mounted with the web thereof in a vertical position. The under side of the channel rests on a series of rollers 61 rotatably mounted in the pedestals 62 bolted or otherwise secured to the floor. Guide rollers 63 mounted to rotate about vertical axes keep the annular channel 60 centered while permitting free rotation thereof. A chain 64 encompasses the flange on the outer side thereof and suitable mechanism is provided for driving this chain.

Any desired means may be used to drive the chain or to actuate the conveyor but it is preferable that this means be such as to permit variation of the speed of the conveyor as well as permit changing the direction of movement thereof. In order to obtain the change of direction of the drive for the conveyor, we employ a reversible motor 65 which operates through a reduction gearing 66 to drive a shaft 67 on the upper end of which is a sprocket 68. It will be noted from an inspection of Fig. 4 that the chain travels around the sprocket 68 and idle sprockets 69 engage the chain, and these may be mounted to tension the chain so that it will have the proper gripping effect on the annular channel 60. The speed of the conveyor may be changed by any suitable speed-reduction gearing and a simple form is illustrated in the drawings. This comprises a split V-pulley 70, the halves of which are urged toward each other by a strong spring 71. A V-belt 72 running to a pulley 73 drives the shaft 74 of the reduction unit 66. The motor 65 is mounted on a vertical slide 75 actuated by hand wheels 76. It will be obvious that vertical movement of the motor caused by actuation of the slide will cause the halves of the split pulley 70 to change their spacing and thereby change the radial distance at which the belt contacts the same. The result is a change in the speed of the conveyor.

With this arrangement, the conveyor can be used as a pace-setter and the speed thereof can be set for the most efficient performance of the operators. While not illustrated in the drawings, in actual use a convenient signal, such as a light, is lit each time the conveyor moves one-seventh of a revolution and remains lighted for a definite period, say five seconds. As the light goes on this indicates to the operators that they have five more seconds to complete their respective operations, and when the light goes out they know that it is time for them to move to the next machine.

TREAD PATTERS AND STITCHERS

In Fig. 8 we have illustrated diagrammatically mechanism used during the automatic operation for stitching the tread and plies together. We also have illustrated the means used by operator No. 5 to assist him in applying the tread. The building drum is indicated at 24 and the tread-applying drum is indicated at 31. This latter drum is mounted on a support 32 pivoted at 33 and is adapted to be swung into and out of operative position adjacent the surface of the tire-building drum. The tread is laid on the drum 31, the surface of which is a counterpart of the outer surface of the tread and this guides the tread into proper position on the building drum. As the drum 24 is rotated the tread 58 is carried around the drum and patting wheels 77 are actuated by a pneumatic cylinder 78 into engagement with the tread to stitch the tread somewhat to the underlying fabric. When the skived ends 78 of the tread have been lapped, No. 5 operator, who applies the tread, moves to the next machine in the series but before doing so he sets in motion the automatic stitching mechanism which comprises a pair of narrow stitching wheels 79, illustrated also in Fig. 16, carried by a non-rotatable shaft 80 having oppositely disposed threads 81 and 82, whereby the stitcher 79 travels outwardly from the center of the tread of the tire to the outer edges thereof as they rotate due to their frictional contact with the rotating tire-carcass. These stitchers are carried by suitable pivoted arms 83 to move from the full- to the dotted-line position illustrated in Fig. 8. The stitchers are normally out of operative position and are swung to operative position by any suitable means. The stitching of the tires, as previously set forth, occurs while there is no operator at the tire-building machine. In other words, it is the operation which is occurring at machine C (Fig. 1) when the operators are in the positions illustrated in that figure.

PLY GUIDES

Figure 20:
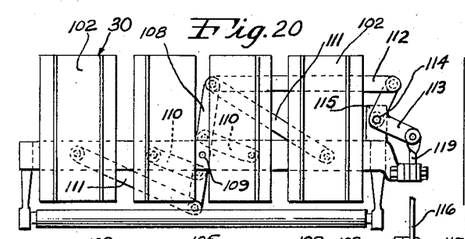
Fig. 20 is a plan view of the chafer and breaker strip guide.
Figure 21:
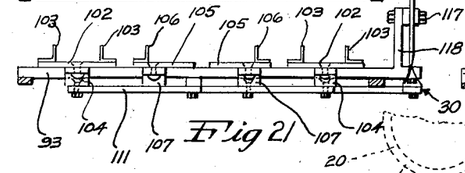
Fig. 21 is an elevational view of the guides shown in Fig. 20.

The ply guides 28, 29 and 30 indicated generally in Fig. 1 are shown more in detail in Figs. 9, 20, 21, 22 and 23. In Fig. 9 we have shown the ply guide 28 which is the guide for the first and second plies. The guide 29 is constructed similarly but for different widths of fabric with an exception to be pointed out hereinafter. The details of the supports for all three guides are the same. In Figs. 20 and 21 we have illustrated the guides for the breaker and chafer strips.

Figure 22:
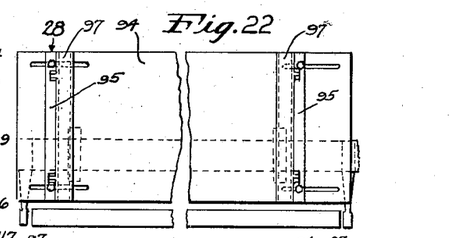
Fig. 22 is a plan view of the ply guide.
Figure 23:
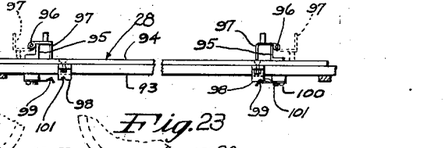
Fig. 23 is an elevation of one end of the guide shown in Fig. 22.

Proceeding first with the description of the ply guide 28, reference is had to Figs. 9, 22 and 23. On the end of the arm 27 is a bracket 90 carrying a plurality of rollers 91 which travel on the track 25 and guide the arms 27 in their angular travel about the support 26. The bracket 90 also has an extension 92 on the lower end of which is mounted a substantially horizontal bar 93 inclined laterally at a slight angle such as illustrated in Fig. 9 and this supports the bottom plate 94 of the ply guide. It is on this plate that the fabric rests as it is guided in a tangential direction onto the drum 24.

Referring now particularly to Figs. 22 and 23, it will be noted that the upper surface of the plate 94 is provided with fixed guides 95 used for guiding the fabric forming the plies onto the building drum when one size of tire is being built. In order to provide for the building of tires using different widths of fabric there is provided a pivot 96 on each of the outer edges of the ply guides 95 on which angular guides 97 swing from their inoperative positions shown in dotted lines to the operative positions shown in full lines. Therefore, when it is desired to use the tire-building apparatus for building two different sizes of tires as previously described, it is only necessary for the operator when he comes to the machine or machines building the odd size of tire to swing the guides 97 into or out of place, as the case may be, and the guide is then proper for guiding the fabric onto that particular machine. On the under side of the plate 94 are a pair of straps 98 which embrace the bar 93 which carries the guide. These U-shaped straps 98 permit sliding movement of the plate 94 along the bar 93.

When placing the first and second plies on the building drum, it is necessary to shift the guide plate 94 to one side when the first ply is being applied and to the other side when the second ply is being applied. In other words, the plies are placed in offset relation to each other on the drum and, since this offset is a definite amount, means is provided for limiting the lateral shifting movement of the plate 94 by means of suitable spring detents 99 secured to the under side of the guide bar 93 by suitable fastening means, such as screws 100. These detents are adapted to engage within the recesses 101 to lock the plate 94 in either the right or the left position thereof as viewed in Figure 23.

The guide 29 is constructed in a manner similar to the guide 28 with the exception that, since the third and fourth plies are laid on the drum with no offset, it is unnecessary to use such detent means as has just been described in connection with Figs. 22 and 23.

In Figs. 20 and 21 we have illustrated the means for guiding the chafer and breaker strips. Again, in this figure there is provided a supporting arm 93 for the guides and suitable slidable guides are mounted on this bar 93. Plates 102 carry the guides 103 for the chafer strips and each of the plates 102 is mounted for sliding movement by means of U-shaped straps 104 secured to the plates and embracing the bar 93. The guide for the breaker strip is composed of two slidable plates 105 having guides 106 thereon. The width of the breaker strip for different sizes of tires varies and therefore the spacing of the guides 106 must be changed to accommodate the different widths used when employing this guide for building tires of different sizes. Each of the plates 105 is provided with a strap 107 on the underside thereof to permit sliding movement of these plates along the bar 93. Suitable mechanism is provided for shifting the plates 102 and 105 along the bar 93. In the present form of the invention we have shown a construction in which there is a central lever 108 pivoted to the bar 93 at 109. Links 110 are pivoted to the lever 108 and to the underside of the brackets 107. Similar links 111 connect the brackets 104 with the lever 108, whereby when the lever 108 is rocked about its pivot 109 in a counter-clockwise direction, the breaker strip guides are drawn inwardly to the proper positions and the guides 106 are drawn inwardly toward each other for the different size of breaker strip which is to be used. Preferably in one position the plates 102 and 105 are in substantially abutting relation to form a substantially continuous support. This would be the position when the lever 108 is rocked in a counter-clockwise direction from that shown in Fig. 20. In order to rock the lever 108 there is provided a lever 112 connected to the end of the lever 108 and to a bell-crank lever 113 pivoted at 114 to an extension 115 on the guide bar 93. A vertically arranged operating lever 116 pivoted at 117 to an extension 118 on the bar 93 is used to operate the bell crank 113 through the intermediacy of a link 119. Thus, provision is made for adjusting the positions of the chafer guides and for changing the effective position of the chafer guide.

In order to locate the ply guides in proper position with respect to the drums, we provide the track 25 with a pair of round-head bolts 120 (see Fig. 9), the heads of these bolts protruding above the upper end of the track. These heads are not very large but are sufficiently so that as the operator moves the rear one of the wheels 91 into a position between the heads of the bolts 120 these heads will locate the ply guide in proper position against accidental displacement until the operator moves to the next machine. It is then only necessary for the operator to employ a small pressure on the ply guide and the roller will ride over the head of the left bolt 120 without appreciable effort.

TIRE-BUILDING STEPS

Figure 11:
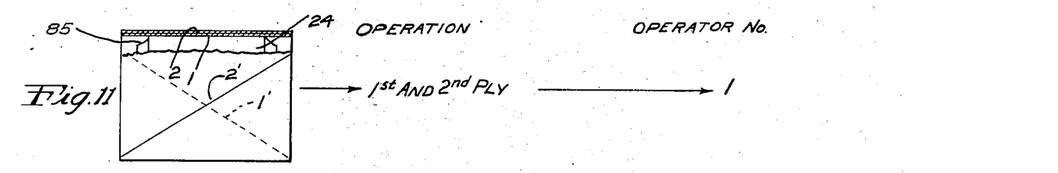
Figs. 11 to 17 inclusive illustrate the different steps in the building of the tires.

In Figs. 11 to 17 inclusive, we have shown the various stages in the building of the tires. In Fig. 11 the tire-building drum 24 shown with the recessed peripheral edges 85 has applied thereto the first and second plies numbered 1 and 2. The plies are applied in the regular manner with the cords running in the opposite direction as indicated by the overlapping edges 1' and 2' of the respective plies 1 and 2. This operation is, as indicated in this figure, performed by operator No. 1.

Figure 12:
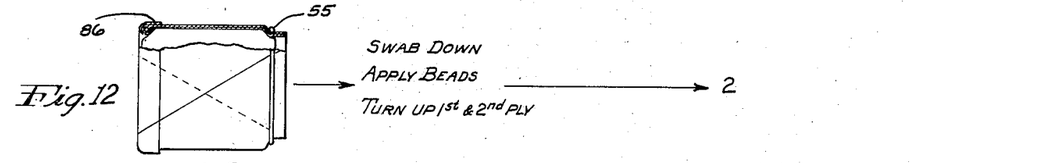

Operator No. 2, as shown in Fig. 12, swabs down the edges of the plies 1 and 2 to fill the recesses 85 in the building drum, and then applies the beads 55 and turns up the edges of 1 and 2 plies over the beads as at 86 shown at the left in this figure.

Figures 13, 14:
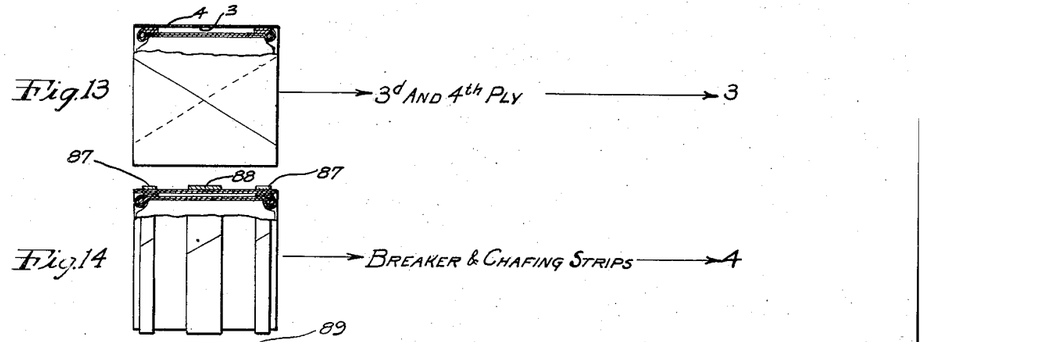

No. 3 operator, as shown in Fig. 13, applies the third and fourth plies 3 and 4 respectively the same as 1 and 2 plies.

Operator No. 4 applies the chafing strips 87 and breaker strip 88.

Figures 15, 16:
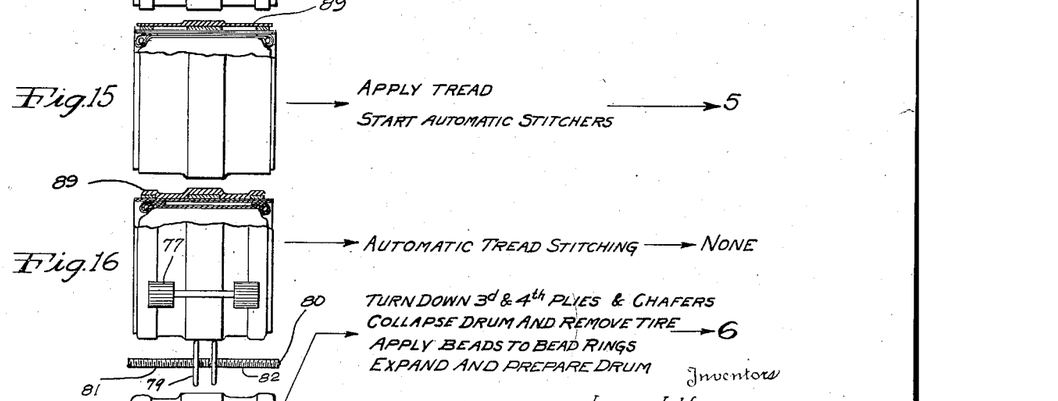

Operator No. 5 places the tread 89 over the chafer and breaker strips.

At the next station the automatic stitching occurs. This is started by operator No. 5 and as the stitchers 79 reach the outer edges of the tire carcass the protruding edges 89 of the overlapped third and fourth plies and side-wall portions of the tread are stitched down around the bead to some extent.

Figure 17:
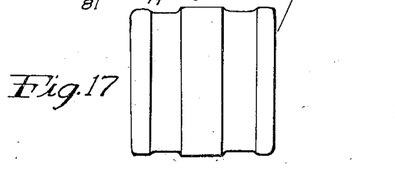

In Fig. 17 is shown the complete tire carcass in which the edges are stitched down completely by No. 6 operator who also collapses the drum and removes the carcass from the drum. This operator, as previously set forth, also applies the beads to the bead rings (not shown), expands the drum and cements the surface thereof in preparation for the next tire to be built thereon.

Each of the operations set forth requires approximately the same amount of time for completion so that when any particular operator is finished with his particular operation all of the operators should be ready to move to their next stations. It will be noted that even if an operator runs a little overtime in completing his operation he has a chance to make up the time in building the next tire and the material which he uses will not have moved sufficiently out of position as to place it in an inconvenient position for him to reach.

MODIFICATIONS

Figure 24:
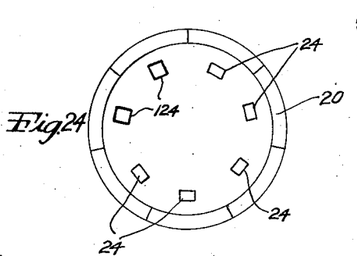
Figs. 24 to 28 show modifications of the tire-building apparatus.

In Fig. 24 we have shown an arrangement wherein the conveyor 20 is the same as that illustrated in Fig. 1 and in which the machines 24 correspond to machines 24 in Fig. 1. In this arrangement, however, we have shown two machines 124 which are machines to build a size of tire different from that built on machines 24. The ply guides and chafer- and breaker-strip guides are the same as previously described and the guides are adjusted so as to be proper for use with machines 124 when moved to one of their positions of adjustment and also right for machines 24 when moved to their other positions of adjustment. The operators operating the ply guides, in walking from machine to machine, merely change the guides when they come to machines 124 and then change them back again as they leave machines 124. Thus, for example, on machines 24 one could build 16 x 600 tires and on machines 124 build 16 x 550 tires. Since the conveyor arrangement is such that each pocket on the conveyor delivers the same material to the same machine at all times, it is only necessary that the proper pockets for the machines 124 be supplied with material for the size tire to be built thereon, the other pockets being filled with material for the machines 24.

Figure 25:
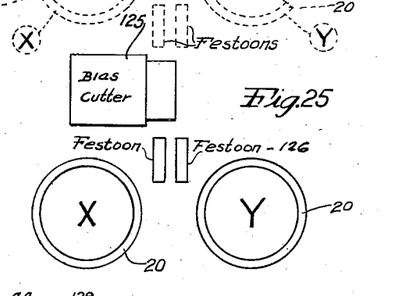

In Fig. 25 we have illustrated diagrammatically the servicing of two units such as disclosed in Fig. 1 from a single bias cutter 125. The units X and Y are supplied with the proper plies either from one or two festoons 126 and each unit is provided with the usual servicing stations for treads, beads and breaker and chafer strips (not shown). If the same size of tire is being built in both units one festoon has been found to be sufficient. If one of the units or both of them are building more than one size of tire, such as described in connection with Fig. 24, then two festoons are used so that four different widths of plies can be obtained, two different widths being supplied by each festoon of the type previously described. The bias cutter operates to cut successively the four different widths required for the two different sizes of tires by means of suitable adjustable stops, such as shown in the patent previously referred to. Two additional units shown in dotted lines in Fig. 25 with suitable additional festoons 126 can all be serviced from a single bias cutter and still not exceed the capacity of the bias cutter or operator thereon.

Figure 26:
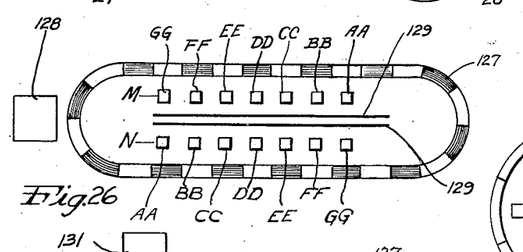

In Fig. 26 we have shown diagrammatically a conveyor 127 of an endless type traveling past two series of machines M and N, each series comprising seven machines the same as in the circle unit. The machines A—A, B—B, C—C, D—D, E—E, F—F and G—G correspond to machines A, B, C, D, E, F and G of the machine shown in Fig. 1. Let us assume that the operators at the machines A—A in both series are placing the first and second plies on their respective building drums. The operator in the M series of machines takes his material from the unshaded sections of the conveyor and the same operator in series N takes his material from the shaded sections of the conveyor, whereby all of the sections in the conveyor may be serviced with the same material at one position such as indicated at 128. It is to be understood that each section of the conveyor 127 is divided up into the same number of pockets as in Fig. 1. The other operators in each of the series take from the sections in a manner similar to that described in connection with Fig. 1 and by having the sections in multiples of the number of machines in the two series the same pockets will always service the same machines. When the operators finish in M series they move over to the N series and vice versa to complete the circuit. Suitable guide bars 129 arranged between the two series of machines are used to support the ply guides in any suitable manner to permit their movement from machine to machine. The tire-building machines in series M and N are so arranged with respect to each other and to the conveyor as to prevent material being taken from the same sections by the corresponding operators in each series.

Figure 27:
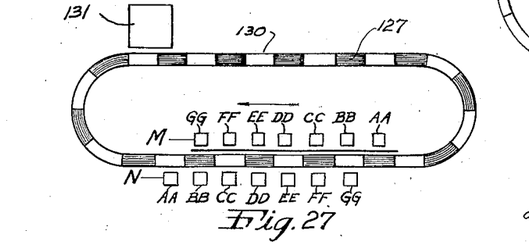

In Fig. 27 we have shown a similar arrangement to that illustrated in Fig. 26 in which the series of machines M and N are staggered on opposite sides of the same run of conveyor with the servicing station for the conveyor 130 arranged at 131 or anywhere along the run of the conveyor which is away from the machines.

Figure 28:
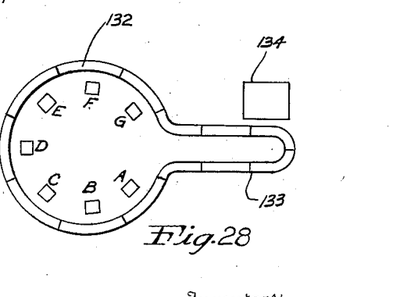

Similarly, in Fig. 28 the seven machines A, B, C,

D, E, F and G can be arranged in a circle as in Fig. 1 with an endless conveyor 132 moving about the circle and at one point moving away from the circle in a loop as shown at 133, with a service station located at 134. In this arrangement preferably the number of pockets in the conveyor is a number such that any particular operator taking material from the conveyor will remove material at some time or other from every section in the conveyor in order to insure that all sections will have utility. For instance, let us assume that in Fig. 28 there are 13 sections in the conveyor. Any operator taking out of the first section would next take it from the third section and then on through the series as follows: 5, 7, 9, 11, 13, 2, 4, 6, 8, 10 and 12. In this connection, we are assuming that the conveyor is moving in the opposite direction to the progress of the men and at a relative speed with respect to the men, the same as set forth in connection with Fig. 1. However, in this connection, different relative speeds may be used and for each relative speed the number of sections in the conveyor can be determined very readily in order to have all the sections utilized by the operators.

The subject matter relating to the feeding of the material from the roll of fabric 44 through the calender, storage festoon, bias cutter and ply festoon, shown particularly in Figs. 1, 6, 7, 10, 18, 19, and 25, is claimed in co-pending application, Serial No. 400,776, filed July 2, 1941.

Various other forms of the invention will occur to those skilled in the art to which this invention pertains and we, therefore, do not wish to limit ourselves to the particular arrangement or construction shown and described in this specification and we do not limit the scope of our invention except as may be hereinafter set forth in the claims hereunto appended.

Having thus fully described our invention, what we claim and desire to secure by Letters Patent of the United States is:

1. In a tire-building apparatus employing a series of tire-building machines on which a series of operators work in succession and in which each operator performs a different operation in the building of the tire, the combination with said machines of a material carrier movable relative to said machines in substantial parallelism thereto to supply material directly to said operators, said carrier having a series of similar sections, each section having a designated group of supports for supporting different component parts of said tire for different operators, the designated supports for the different component parts being substantially similarly arranged in each section, and means for moving said carrier and machines relative to each other always in the same relative direction to present a different section to each operator as he moves to the next machine in the series to perform his operation at said machine.

2. In a tire-building machine, the combination with a series of fixed tire-building machines, of a conveyor, means for moving said conveyor past said machines, said conveyor having suitably designated supporting means for a series of similar groups of different types of materials to be used in the different stages of tire building by the operators, the conveyor moving always in a direction opposite to the direction in which the operators are adapted to move from machine to machine in the tire-building process, the linear rate of advance of the conveyor being in multiples of the scheduled rate of progress of operators from machine to machine.

3. In a tire-building apparatus, the combination with a group of tire-building machines arranged in series, of a conveyor movable past said machines and having suitably designated material supports for supporting the various materials used in tire-building, the material supports for the materials to be supplied to each machine being spaced along said conveyor in a predetermined order at substantially the same level and at intervals to bring the desired material adjacent the desired machine at the time the operator applying that material is ready for same, the conveyor having a uniform rate of progress past said machines, each support for a given type of material being so arranged as to always supply the same type of material to only one certain machine at all times.

4. In a tire-building apparatus, the combination with a series of fixed tire-building machines arranged in a circular formation, and a movable annular conveyor for supplying materials to said machines having material-receiving supports spaced substantially uniformly thereabout in substantially a single plane, each support carrying a different component part of the tire than the preceding support.

5. The method of building tires on a series of tire-building machines provided with a material carrier movable relative to the series in substantially parallelism thereto, comprising the steps of placing each of different tire component materials on said carrier at substantially evenly spaced positions therealong, with at least one kind of material for a particular tire-building operation interspersed between other materials for a different tire building operation and moving the carrier at a speed relative to the machines such that the different materials for each tire-building operation are presented to the machines in timed sequence, which is substantially equal to the interval required for the completion of the preceding operation on the machines, and applying the materials to the tire-building machines.

6. The method of building tires on a series of tire-building machines provided with a material carrier movable relative to the series in substantially parallelism thereto, comprising the steps of placing each of different tire component materials on said carrier at substantially evenly spaced positions therealong, with at least one kind of material for a particular tire-building operation interspersed between other materials for a different tire building operation and moving the carrier at a speed relative to the machines such that the different materials for each tire-building operation are presented to the machines in timed sequence, which is substantially equal to the interval required for the completion of the preceding operation on the machines and applying the materials to the tire-building machines, two or more of said machines having the different needed tire component materials presented thereto at the same time, whereby the tires on these machines are in different stages of building and permit specialized operators to perform successively the same tire-building operations on said two or more machines.

7. A tire-building apparatus comprising a plurality of tire-building machines arranged in series, at least one of the tire-building machines being for building a different size tire than others in the series, a conveyor arranged and constructed to deliver adjacent each machine the proper material at the right time for each size of tire being built and an adjustable guide for guiding material onto each of said tire-building machines, the ply guide being quickly shiftable to different adjusted positions for the different materials used on the different tire-building machines, and being mounted for movement from machine to machine in the series.

8. Apparatus for building tires comprising an endless stock conveyor having a series of material supports arranged thereon substantially in line, a plurality of series of tire-building machines arranged along said stock conveyor, each series of machines being adapted to be operated upon by operators working successively at said machines to form specialized operations thereon, and said stock conveyor having the supports for the different materials distributed therealong and suitably designated for the respective materials so that the respective supports lie adjacent the proper machines at the time the operators work on said machines, the supports being so distributed that each of the machines in the series is supplied from different designated supports than those which supply the other series.

9. Apparatus for building tires comprising an endless stock conveyor having a series of material supports arranged thereon substantially in line, a plurality of series of tire-building machines arranged along said stock conveyor, each series of machines being adapted to be operated upon by operators working successively at said machines to perform specialized operations thereon, and said stock conveyor having the supports for the different materials distributed therealong and suitably designated for the respective materials so that the respective supports lie adjacent the proper machines at the time the operators work on said machines, the supports being so distributed that each of the machines in the series is supplied from different designated supports than those which supply the other series, the same supports servicing the same machines with the same material at all times and none other.

10. In a tire-building apparatus, the combination with a series of tire-building machines arranged in closed formation and substantially equally spaced whereby a series of operators working on said machines successively travel substantially the same distance in moving from any particular machine to the next in the series, of an endless conveyor from which the tire builders remove the needed materials having material supports thereon movable past said series of machines at a distance within easy reach of the operator and at a substantially uniform distance from each machine, the conveyor having a portion thereof extending away from the series of machines in a loop, and a servicing station adjacent said looped portion of said conveyor.

11. The method of building tires on a series of tire-building machines arranged in a closed path, provided with a material carrier movable in a closed path relative to the series in substantial parallelism thereto, comprising the steps of placing each of different tire component materials on said carrier at substantially evenly spaced positions therealong, with at least one kind of tire component material for a particular tire-building operation interspersed between other kinds of tire component materials and moving the carrier at a speed relative to the machines such that the different materials for each tire-building operation are presented to the machines in timed sequence, which is substantially equal to the interval required for the completion of the preceding operation on the machines, and applying the material on the tire-building machine.

12. The method, according to claim 5, which includes the step of moving said carrier continuously.

13. The method, according to claim 5, which includes the step of moving said conveyor continuously and at a uniform speed.

14. The method, according to claim 5, which includes the step of moving said conveyor intermittently.

15. In a tire-building apparatus the combination of a series of substantially equally spaced tire-building machines in series, and a material conveyor movable past said series of machines in substantial parallelism thereto and at a distance conveniently accessible to operators at said machines, said conveyor having a plurality of successively arranged material supports to hold different component elements of a tire, the supports for a given component part being substantially equally spaced along the conveyor a distance such as to bring each such support in corresponding relation to different ones of said tire-building machines, additional supports for other component parts being similarly substantially equally spaced along said conveyor and interspersed between the first-mentioned supports.

16. In a tire-building apparatus the combination with a series of substantially equally spaced tire-building machines in series, of a material conveyor movable past said series of machines in substantial parallelism thereto and at a distance conveniently accessible to operators at said machines, said conveyor having a plurality of successively arranged material supports to hold different component elements of a tire, the supports for a given component part being substantially equally spaced along the conveyor a distance such as to bring each such support in corresponding relation to different ones of said tire-building machines, additional supports for other component parts being similarly substantially equally spaced along said conveyor and interspersed between the first-mentioned supports and means for moving said conveyor with a continuous uniform motion past said machines.

17. In a tire-building apparatus, the combination with a series of tire-building machines of a conveyor mounted for movement past said machines for moving material to operators at said machines and divided into sections so spaced that there is at least one such section adjacent each machine in series at all times and in substantially the same position with respect thereto, each section having separate supports for a plurality of different tire components used in building a tire, and means for moving said conveyor past said machines to cause said sections to successively occupy positions adjacent each of the machines in series.

18. In a tire-building apparatus, the combination with a series of tire-building machines of a conveyor moving past said machines for moving material to operators at said machines and divided into sections so spaced that there is at least one such section opposite each machine in series at all times and in substantially the same position with respect thereto, each section having separate supports for a plurality of different tire components used in building a tire, substantially all of said separate supports being arranged in tandem relation with respect to each other, and means for moving said conveyor past said machines to cause said sections to successively occupy positions opposite each of the machines in series.

19. In a tire-building apparatus, the combination with a series of tire-building machines arranged in circular formation of a circumscribing continuous circular conveyor mounted for movement past said machines for moving material to operators at said machines and divided into sections so spaced that there is at least one such section opposite each machine in series at all times and in substantially the same position with respect thereto, each section having separate supports for a plurality of different tire components used in building a tire, and means for moving said conveyor past said machines to cause said sections to successively occupy positions opposite each of the machines in series.

20. A device as set forth in claim 19 in which the conveyor is rigid and the supports thereof are in vertical cross-section.

21. In a tire-building apparatus, the combination with a series of tire-building machines on which operators work successively of a conveyor moving past said machines for moving material to operators at said machines and divided into sections so spaced that there is at least one such section opposite each machine in series at all times and in substantially the same position with respect thereto, each section having separate supports for a plurality of different tire components used in building a tire, and means for moving said conveyor past said machines in a direction opposite to the progressive movement of the operators in moving to successive machines in the series to cause said sections to successively occupy positions opposite each of the machines in series.

22. In a method of building tires on a series of tire-building machines which are arranged in a defined path substantially equally spaced from each other, the steps of arranging tire-component materials in groups and with the materials in each group in tandem and moving said groups so arranged past said machines and within easy reach of the operators at the machines, each of the groups containing substantially all of the component elements of the tire, and being arranged in tandem with the other groups.

23. In a method of building tires on a series of tire-building machines which are arranged in a defined path substantially equally spaced from each other, the steps of moving a line of tire-component materials with a continuous motion past said machines in groups, and within easy reach of the operators at the machines, each of the groups containing substantially all of the component elements of the tire and each group bearing the same relation to an adjacent machine as other groups during the movement of said groups along their path of movement.

24. In a method of building tires on a series of tire-building machines which are arranged in a circular path substantially equally spaced from each other, the steps of moving a line of tire-component materials along a circular path past said machines in groups, and within easy reach of the operators at the machines, the groups containing substantially all of the component elements of the tire and the center of each group being angularly spaced from the center of an adjacent group substantially the angular distance between tire-building machines.

25. In a tire-building apparatus, the combination with a series of tire-building machines on which operators work successively, of a conveyor moving past said machines for moving material to operators at said machines and divided into sections so spaced that there is at least one such section opposite each machine in series at all times and in substantially the same position with respect thereto, each section having separate supports for a plurality of different tire components used in building a tire, said supports being arranged at a substantially uniform height, and means for moving said conveyor past said machines to cause said sections to successively occupy positions opposite each of the machines in series.

26. In a tire-building apparatus, the combination with a circular series of tire-building machines on which operators work successively, of an annular conveyor moving past said machines for moving material to operators at said machines and peripherally divided into sections so spaced that there is at least one such section opposite each machine in series at all times and in substantially the same position with respect thereto, each section having separate supports for a plurality of different tire components used in building a tire, and means for moving said conveyor past said machines to cause said sections to successively occupy positions opposite each of the machines in series.

27. In a tire-building apparatus, the combination with a circular series of tire-building machines on which operators work successively, of an annular conveyor moving past said machines for moving material to operators at said machines and divided into sections so spaced that there is at least one such section opposite each machine in series at all times and in substantially the same position with respect thereto, each section having separate peripherally arranged supports for a plurality of different tire components used in building a tire, and means for moving said conveyor past said machines to cause said sections to successively occupy positions opposite each of the machines in series.

28. In a tire-building apparatus, the combination with an odd number of circularly arranged tire-building machines on which operators work successively each to build a designated portion only of the tire, said machines being substantially equally spaced from each other, a conveyor mounted for movement circumscribing said machines a distance within easy reach of the operators at said machines, said conveyor being divided into sections of the same number as said machines and each section having individual supports for the different component parts of the tire, and means for moving said conveyor.

29. In a tire-building apparatus, the combination with an odd number of circularly arranged tire-building machines on which operators work successively each to build a designated portion only of the tire, said machines being substantially equally spaced from each other, a conveyor mounted for movement circumscribing said machines a distance within easy reach of the operators at said machines, said conveyor being divided into sections of the same number as said machines and each section having individual supports for the different component parts of the tire, and means for moving said conveyor in a direction opposite to the movement of the operators from machine to machine and at a rate equal to the rate of progress of the operators from machine to machine.

30. In a tire-building apparatus, the combination with a circular series of tire-building machines including building drums, of a pivot centrally located with respect to said series, a circular track inwardly of said series, a fabric guide mounted on said track, and an arm secured to said guide and pivotally mounted on said pivot, whereby said guide can be selectively moved to any of said tire-building drums at will.

31. In a tire-building apparatus, the combination with a circular series of tire-building machines including building drums, of a pivot centrally located with respect to said series, a circular track inwardly of said series, a fabric guide mounted on said track, an arm secured to said guide and pivotally mounted on said pivot, whereby said guide can be selectively moved to any of said tire building drums at will, and at least one other additional similarly mounted guide independently movable as aforesaid.

32. In a tire-building apparatus, the combination with a circular series of tire-building machines including building drums, of a pivot centrally located with respect to said series, a circular track inwardly of said series, a fabric guide mounted on said track, an arm secured to said guide and pivotally mounted on said pivot, whereby said guide can be selectively moved to any of said tire building drums at will, and detent means on said track for locating said guides in proper position adjacent said drums, said guide being releasable from said detent means by horizontal pressure exerted horizontally on said guide.

33. In a tire-building apparatus the combination with a series of tire-building machines, of material-conveying mechanism mounted for relative movement past said machines for presenting material to operators at said machines, comprising groups of material supports arranged in succession and relatively movable past said machines in succession to present said materials at positions readily accessible to the operators at said machines, each group comprising supports for several different component parts of a tire, the groups being so arranged with respect to each other that different groups are substantially simultaneously positioned adjacent different ones of said machines and each group is in turn presented to each succeeding machine in the series as the conveying means advances relative to said machines.

34. The method of building tires on a series of tire-building machines which comprises arranging different component materials of a tire in groups containing substantially all of the component parts of a tire, moving said groups in succession relative to said tire-building machines along a path such as to bring each group conveniently adjacent to each said machine while maintaining said groups in substantially the same relation with respect to each other whereby different groups are presented simultaneously to different ones of said machines in the series and in substantially the same relation thereto.

35. A method as set forth in claim 34 in which a given tire component material occupies a recurring similar position in each group.

36. In a tire-building apparatus, the combination with an odd number of circularly arranged tire-building machines on which operators work successively each to build a designated portion only of the tire, said machines being substantially equally spaced from each other, a conveyor mounted for movement past said machines a distance within easy reach of the operators at said machines, said conveyor being divided into sections of the same number as said machines and each section having individual supports for the different component parts of the tire, and means for moving said conveyor.

37. In a tire-building apparatus the combination with a series of fixed tire-building machines and a movable conveyor for supplying materials to said machines having material-receiving supports spaced substantially uniformly therealong and substantially all of said supports being arranged substantially in a single plane, each support carrying a different component part of the tire than the preceding support and each support for a given component part of a tire recurring at substantially regular intervals along the conveyor.

38. The method of building tires on a fixed series of tire-building machines comprising building said tires, element on element, with the tires on the various successive machines in the series in successively greater stages of completion, moving a series of groups of tire-building elements past said machines in a direction from the machine having a tire in a lesser stage of completion toward those at the greater stages of completion with each group containing the various elements required for a plurality of the tire-building stages, withdrawing the desired elements from said group as same arrive at the tire-building machines and applying them to the tire-building machines, and replenishing the elements in the groups as the groups pass a servicing station, said groups always progressing in the same direction relative to said machines.

39. The method of building tires on a fixed series of tire-building machines comprising building said tires, element on element, with the tires on the various successive machines in the series in successively greater stages of completion, moving a series of groups of tire-building elements past said machines in a direction from the machine having a tire in a lesser stage of completion toward those at the greater stages of completion with each group containing all of the various elements required for a plurality of the tire-building stages, withdrawing the desired elements from said group as same arrive at the tire-building machines and applying them to the tire-building machines, and replenishing the elements in the groups as the groups pass a servicing station, said groups always progressing in the same direction relative to said machines.

40. The method of building tires on a fixed series of tire-building machines comprising building said tires, element on element, with the tires on the various successive machines in the series in successively greater stages of completion with a uniform fixed interval of time allowed for completion of each stage, moving a series of groups of tire-building elements past said machines in a direction from the machine having a tire in a lesser stage of completion toward those at the greater stages of completion with each group containing the various elements required for a plurality of the tire-building stages, withdrawing the desired elements from said group as same arrive at the tire-building machines and applying them to the tire-building machines, and replenishing the elements in the groups as the groups pass a servicing station, said groups always progressing in the same direction relative to said machines, and the rate of movement of said groups being the space interval between adjacent tire-building machines in the time interval allowed for completion of each stage.

41. The method of building tires on a fixed series of tire-building machines comprising building said tires, element on element, with the tires on the various successive machines in the series in successively greater stages of completion with a uniform fixed interval of time allowed for completion of each stage, moving a series of groups of tire-building elements past said machines in a direction from the machine having a tire in a greater stage of completion toward those at the lesser stages of completion with each group containing the various elements required for a plurality of the tire-building stages, withdrawing the desired elements from said group as same arrive at the tire-building machines and applying them to the tire-building machines, and replenishing the elements in the groups as the groups pass a servicing station, said groups always progressing in the same direction relative to said machines, and the rate of movement of said groups being in multiples of the space interval between adjacent tire-building machines during the time interval allowed for completion of each stage.

42. The method of building tires on a fixed series of tire-building machines comprising building said tires, element on element, with the tires on the various successive machines in the series in successively greater stages of completion with a uniform fixed interval of time allowed for completion of each stage, moving a series of groups of tire-building elements past said machines in a direction from the machine having a tire in a greater stage of completion toward those at the lesser stages of completion with each group containing the various elements required for a plurality of the tire-building stages, withdrawing the desired elements from said group as same arrive at the tire-building machines and applying them to the tire-building machines, and replenishing the elements in the groups as the groups pass a servicing station, said groups always progressing in the same direction relative to said machines, and the rate of movement of said groups being twice the space interval between adjacent tire-building machines during the time interval allowed for completion of each stage.

43. In a tire-building apparatus the combination with a series of tire-building machines on which the tires are built in successive stages and wherein during operation of the apparatus tires are in progressively different stages of completion on said series, of stock-supplying means movable relative to said series in a path substantially parallel thereto, said stock-supplying means including a plurality of groups of supports, each group containing supports for several of the different elements used in building the tires and means for moving said groups past said machines in a direction from the machine on which the tires are in the lesser stage of completion toward those machines on which the tires are in the successively greater stages of completion, and servicing stations adjacent the path of movement of said supports for replenishing said supports with the required elements as they pass said stations, said groups always progressing in the same direction relative to said machines.

44. In a tire-building apparatus the combination with a series of tire-building machines on which the tires are built in successive stages and wherein during operation of the apparatus tires are in progressively different stages of completion on said series, of stock-supplying means movable relative to said series in a path substantially parallel thereto, said stock supplying means including a plurality of groups of supports, each group containing supports for all of the different elements used in building the tires and means for moving said groups past said machines in a direction from the machine on which the tires are in the lesser stage of completion toward those machines on which the tires are in the successively greater stages of completion, and servicing stations adjacent the path of movement of said supports for replenishing said supports with the required elements as they pass said stations, said groups always progressing in the ame direction relative to said machines.

45. In a tire-building apparatus the combination with a series of tire-building machines on which the tires are built in successive stages and wherein during operation of the apparatus tires are in progressively different stages of completion of said series, of stock-supplying means movable relative to said series in a path substantially parallel thereto, said stock-supplying means including a plurality of groups of supports, each group containing supports for all of the different elements used in building the tires on said machines, and means for moving said groups past said machines in a direction from the machine on which the tires are in the lesser stage of completion toward those machines on which the tires are in the successively greater stages of completion, and servicing stations adjacent the path of movement of said supports for replenishing said supports with the required elements as they pass said stations, the said groups always progressing in the same direction relative to said machines and extending over a distance substantially that of the spacing of two adjacent machines.

46. In a tire-building apparatus the combination with a series of tire-building machines on which the tires are built in successive stages and wherein during operation of the apparatus tires are in progressively different stages of completion on said series, of stock-supplying means movable relative to said series in a path substantially parallel thereto, said stock-supplying means including a plurality of groups of supports, each group containing supports for several of the different elements used in building the tires and means for moving said groups past said machines in a direction from the machine on which the tires are in the greater stage of completion toward those machines on which the tires are in the successively lesser stages of completion, and servicing stations adjacent the path of movement of said supports for replenishing said supports with the required elements as they pass said stations, said groups always progressing in the same direction relative to said machines and being moved a distance at least twice the distance between adjacent machines in the time allowed for the completion of the different stages of tire building.

JORGEN I. HAASE.
WILLIAM W. McMAHAN.
CHARLES J. ROESE.